United States Patent
Jung et al.

(10) Patent No.: US 11,907,761 B2
(45) Date of Patent: Feb. 20, 2024

(54) ELECTRONIC APPARATUS TO MANAGE MEMORY FOR LOADING DATA AND METHOD OF CONTROLLING THE SAME

(71) Applicant: Samsung Electronics Co., Ltd., Suwon-si (KR)

(72) Inventors: Jihun Jung, Suwon-si (KR); Jusun Song, Suwon-si (KR); Jaehoon Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 146 days.

(21) Appl. No.: 17/266,758

(22) PCT Filed: Sep. 3, 2019

(86) PCT No.: PCT/KR2019/011298
§ 371 (c)(1),
(2) Date: Feb. 8, 2021

(87) PCT Pub. No.: WO2020/050578
PCT Pub. Date: Mar. 12, 2020

(65) Prior Publication Data
US 2021/0311789 A1    Oct. 7, 2021

(30) Foreign Application Priority Data
Sep. 4, 2018    (KR) .................... 10-2018-0105223

(51) Int. Cl.
*G06F 9/50*    (2006.01)
*G06F 9/445*    (2018.01)
(Continued)

(52) U.S. Cl.
CPC ............ *G06F 9/5016* (2013.01); *G06F 9/445* (2013.01); *G06F 9/4812* (2013.01);
(Continued)

(58) Field of Classification Search
None
See application file for complete search history.

(56) References Cited

U.S. PATENT DOCUMENTS 5,903,899 A * 5/1999 Steele, Jr. ........... G06F 12/0253
5,950,221 A     9/1999 Draves et al.
(Continued)

FOREIGN PATENT DOCUMENTS

JP    H8-286933        11/1996
JP    2006171927 A *   6/2006
(Continued)

OTHER PUBLICATIONS

International Search Report dated Dec. 27, 2019 from International Application No. PCT/2019/011298, 4 pages.
(Continued)

*Primary Examiner* — Abu Zar Ghaffari
(74) *Attorney, Agent, or Firm* — STAAS & HALSEY LLP

(57) ABSTRACT

An electronic apparatus including a storage; a processor configured to execute a program including an OS and application program stored in the storage; and a memory configured to load and store the program based on execution of the program, the processor being configured to control the OS to, based on an execution of a process of the application program, create a user stack corresponding to at least one task of the process and store data of the user stack in a predetermined area of the memory; based on a predetermined event being generated in a state which the process is executed, stop change in the data of the predetermined area; discard an area in which data used in a procedure of initiating the process among the stored data is stored, in the
(Continued)

predetermined area; and based on a work corresponding to the predetermined event being completed, continuously perform the operation.

9 Claims, 13 Drawing Sheets

(51) Int. Cl.
    *G06F 9/48*     (2006.01)
    *G06F 12/02*     (2006.01)

(52) U.S. Cl.
    CPC ........ *G06F 9/5022* (2013.01); *G06F 12/0253* (2013.01); *G06F 2212/1044* (2013.01)

(56) References Cited

U.S. PATENT DOCUMENTS

| | | | | |
|---|---|---|---|---|
| 6,192,517 | B1* | 2/2001 | Agesen | G06F 12/0253 711/E12.009 |
| 7,516,292 | B2* | 4/2009 | Kimura | G06F 12/0253 711/170 |
| 7,581,220 | B1* | 8/2009 | Roeck | G06F 11/1469 711/100 |
| 2002/0166116 | A1* | 11/2002 | Eidt | G06F 12/0253 711/E12.009 |
| 2004/0193828 | A1* | 9/2004 | Nevill | G06F 12/0253 711/170 |
| 2005/0021917 | A1 | 1/2005 | Mathur et al. | |
| 2006/0230157 | A1* | 10/2006 | Ganapathy | G06F 9/5016 709/227 |
| 2008/0301687 | A1* | 12/2008 | Gosalia | G06F 9/5016 718/103 |
| 2009/0070740 | A1* | 3/2009 | Onodera | G06F 9/4488 717/116 |
| 2010/0250893 | A1* | 9/2010 | Cummins | G06F 12/0253 711/E12.017 |
| 2011/0107038 | A1* | 5/2011 | Akiyama | G06F 12/0269 711/E12.001 |
| 2011/0145304 | A1* | 6/2011 | Gray | G06F 12/0253 707/820 |
| 2011/0173627 | A1* | 7/2011 | Murakami | G06F 9/485 718/103 |
| 2014/0195766 | A1* | 7/2014 | Taillefer | G06F 12/0261 711/170 |
| 2014/0365834 | A1 | 12/2014 | Stone et al. | |
| 2015/0212891 | A1* | 7/2015 | Douros | G06F 11/1438 714/15 |
| 2018/0307600 | A1* | 10/2018 | Wang | G06F 12/02 |

FOREIGN PATENT DOCUMENTS

| | | |
|---|---|---|
| KR | 1999-0050564 | 7/1999 |
| KR | 10-2001-0038482 | 5/2001 |

OTHER PUBLICATIONS

Korean Office Action dated Nov. 26, 2023 for Korean Application No. 10-2018-0105223.

* cited by examiner

ELECTRONIC APPARATUS TO MANAGE MEMORY FOR LOADING DATA AND METHOD OF CONTROLLING THE SAME

CROSS-REFERENCE TO RELATED APPLICATIONS

This application is a U.S. National Stage Application which claims the benefit under 35 U.S.C. § 371 of International Patent Application No. PCT/KR2019/011298 filed on Sep. 3, 2019, which claims foreign priority benefit under 35 U.S.C. § 119 of Korean Patent Application No. 10-2018-0105223 filed on Sep. 4, 2018 in the Korean Intellectual Property Office, the contents of each of which are incorporated herein by reference.

TECHNICAL FIELD

The disclosure relates to an electronic apparatus and a method of controlling the same, and more particularly to an electronic apparatus, in which a memory loaded with data is managed based on execution of a process, and a method of controlling the same.

BACKGROUND ART

An operating system (OS) refers to a set of programs, which provides an interface so that a user can more easily use hardware in an electronic apparatus, and has a user mode and a kernel mode.

In the user mode, a process operates as a user application program.

In the kernel mode, a task management, a memory management, a file system, a device control and the like sub systems operate. These are in charge of controlling hardware, and provides services needed for operations of the process.

The process includes one or more tasks, and a user stack is generated in units of tasks under the user mode. When the process is executed, a memory area is assigned to the user stack generated while the task is running a code.

A stack pointer (SP) refers to a register that points at a location where data is assigned in the stack. In other words, meaningful data is assigned up to an area which the stack pointer points at, but areas after that are empty or assigned with meaningless data or data unused by the processor. The meaningful data refers to data that is being used by the process.

In general, the range of the memory assigned to the stack is dynamically increased as the process calls a function due to initialization at its early execution stage. When the function is then returned, the size of the stack is decreased again.

Therefore, most processes are decreased in the size of the stack after the initialization is completed, and the user stack assigned with the memory area is likely to include data not to use, i.e., data not required to be stored.

In this case, such data wastefully occupies the memory, and therefore an available memory area for another process is decreased, thereby causing inefficient use of the memory area.

DISCLOSURE

Technical Problem

To solve the foregoing problems, the disclosure provides an electronic apparatus and a method of controlling the same, in which data not required to be stored is managed not to occupy a memory area after initialization of a predetermined process is completed, thereby more efficiently using the memory area.

Technical Solution

According to an embodiment of the disclosure, an electronic apparatus may include a storage; a processor configured to execute a program stored in the storage; and a memory configured to load the program based on execution of the program, wherein: the program includes an operating system (OS) and an application program, a user stack is assigned to a process of the application program, data of the user stack is stored in a certain area of the memory based on execution of the process, and the OS discards an area of the memory, in which data not to use among the data of the user stack is stored, during stopped change in the data of the user stack, and allows the discarded area to be usable by another process.

The OS may discard the area of the memory based on transition of the process from a user mode to a kernel mode.

The discarded area of the memory may be identified based on a stack pointer that points at a location of data assigned to the user stack.

The process may include one or more tasks, the user stack may be created in units of tasks based on execution of the process, and a certain area of the memory may be assigned to the created user stack.

The OS may discard an area of the memory, in which the data not to use is stored, among areas of the memory, to which the user stacks created corresponding to running tasks are assigned, based on transition of the running tasks from the user mode to the kernel mode.

The OS in the user mode may enter the kernel mode, based on occurrence of a system call or an interrupt from the running task.

The discarded area of the memory may be identified based on the stack pointer that points at a location of data assigned to the user stack, based on the running task in the user mode enters the kernel mode.

The OS may discard an area of the memory, in which the data not to use is stored, among areas of the memory assigned to user stacks of waiting tasks, during operation of the processor in the kernel mode.

The OS may execute a predetermined daemon to discard the area of the memory of the waiting tasks, during operation of the process in the kernel mode.

The discarded area of the memory may be identified based on the stack pointer that points at a location of data assigned to the user stacks of the waiting tasks.

The OS may discard an area of the memory during operation of the processor in the kernel mode.

According to an embodiment of the disclosure, a method of controlling an electronic apparatus including a storage, a processor configured to execute a program stored in the storage, and a memory configured to load the program based on execution of the program includes: storing data of a user stack assigned to a process in a certain area of the memory based on execution of an application program; and by an operating system (OS), discarding an area of the memory, in which data not to use among the data of the user stack is stored, during stopped change in the data of the user stack, and allowing the discarded area to be usable by another process.

The discarding the area of the memory may include discarding the area of the memory based on transition of the process from a user mode to a kernel mode.

The discarding the area of the memory may include identifying the discarded area of the memory based on a stack pointer that points at a location of data assigned to the user stack.

The process may include one or more tasks, the user stack may be created in units of tasks based on execution of the process, and a certain area of the memory may be assigned to the created user stack.

The method may further include discarding an area of the memory, in which the data not to use is stored, among areas of the memory, to which the user stacks created corresponding to running tasks are assigned, based on transition of the running tasks from the user mode to the kernel mode.

The method may further include: by the OS, switching over from the user mode to the kernel mode based on occurrence of a system call or an interrupt from the running task; and identifying an area of the memory discarded based on the stack pointer that points at a location of data assigned to the user stack, based on transition of the OS from the user mode to the kernel mode.

The method may further include discarding an area of the memory, in which data not to use is stored among areas of the memory assigned to the user stacks of the waiting tasks, during operation of the process in the kernel mode.

The OS executes a predetermined daemon to discard the area of the memory of the waiting tasks, during operation of the process in the kernel mode.

The method may further include identifying an area of the memory discarded based on the stack pointer that points at a location of data assigned to the user stacks of the waiting tasks.

Advantageous Effects

As described above, according to an electronic apparatus of the disclosure and a method of controlling the same, an area of a memory, to which unused data not required to be stored among data of a user stack is assigned, is discarded to efficiently use the memory, thereby substantially reducing the memory.

Further, according to the disclosure, when a task is switched over from a user mode to a kernel mode, a memory area assigned to a user stack generated corresponding to the task is controlled to be discarded, thereby efficiently discarded the unused area of the memory while data of the user stack is not changed.

Further, according to the disclosure, areas, in which data not to use is stored, among areas assigned to user stacks of tasks being on standby by a predetermined daemon operating in a kernel mode are discarded in a lump, thereby improving usability of a memory area by a mechanism different from the existing memory reclaim.

BEST MODE

Figure 1:
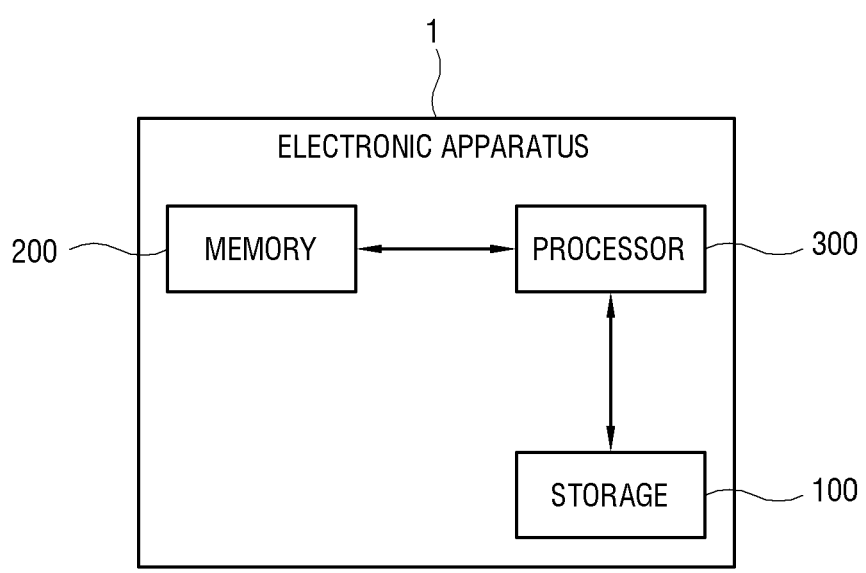
FIG. 1 is a block diagram of an electronic apparatus according to an embodiment of the disclosure.

Below, exemplary embodiments will be described in detail with reference to accompanying drawings. In the drawings, like numerals or symbols refer to like elements having substantially the same function, and the size of each element may be exaggerated for clarity and convenience of description. However, the configurations and functions illustrated in the following exemplary embodiments are not construed as limiting the present inventive concept and the key configurations and functions. In the following descriptions, details about publicly known functions or features will be omitted if it is identified that they cloud the gist of the present inventive concept.

In the following exemplary embodiments, terms 'first', 'second', etc. are only used to distinguish one element from another, and singular forms are intended to include plural forms unless otherwise mentioned contextually. In the following exemplary embodiments, it will be understood that terms 'comprise', 'include', 'have', etc. do not preclude the presence or addition of one or more other features, numbers, steps, operation, elements, components or combination thereof. In addition, a 'module' or a 'portion' may perform at least one function or operation, be achieved by hardware, software or combination of hardware and software, and be integrated into at least one module. In the disclosure, at least one among a plurality of elements refers to not only all the plurality of elements but also both each one of the plurality of elements excluding the other elements and a combination thereof.

FIG. 1 is a block diagram of an electronic apparatus according to an embodiment of the disclosure.

According to an embodiment, an electronic apparatus 1, as shown in FIG. 1, includes a storage 100, a memory 200 and a processor 300.

The storage 100 is configured to store programs. The programs stored in the storage 100 include an operating system (OS), and an application program (hereinafter, referred to as a user application program or a user application). The OS may include a kernel, or the OS may correspond to the kernel.

The kernel, which refers to a program that is the core of the OS, has control over a system to provide various services needed for running of the application program and other parts of the OS, and manages important resources (e.g., a processor, a memory, a file, peripheral devices, etc.) of the system. According to an embodiment of the disclosure, discard of a memory area to be described later is performed by the OS, i.e., the kernel.

In this specification, the OS refers to system software that not only manages system hardware but also system software of providing a common system service with a hardware abstraction platform to execute internal programs of the electronic apparatus 1. Further, the OS mediates between the programs and the hardware of the electronic apparatus 1.

The application program may ask the kernel for accessing the hardware. When the kernel is asked by the application program, the kernel issues an instruction to the hardware and transmits a result to the application program.

The storage 100 may be provided as a writable nonvolatile storage device which can retain data even though the electronic apparatus 1 is powered off, and mirror changes. For example, the storage 100 may include at least one among a hard disk drive (HDD), a flash memory, an electrically programmable ROM (EPROM) or an electrically erasable and programmable ROM (EEPROM).

A memory 200 loads a program in response to execution of the program stored in the storage 100. The memory 200 refers to a volatile memory, which includes a random access memory (RAM) such as a dynamic RAM (DRAM) or a static RAM (SRAM).

A virtual memory is one of methods of managing the RAM, and refers to a virtual memory space that does not physically exist. When the program is executed, data is loaded from the virtual memory to the physical memory, i.e., the actual memory 200 according to tasks of a process corresponding to the program. Unless otherwise specified below, the term 'memory' refers to a physical memory distinguished from the virtual memory.

The memory 200 is accessible through a memory address, in which the address includes a virtual address of the virtual memory and a physical address of the physical memory. The physical address refers to a direct location of the memory 200, and the virtual address refers to a logical address assigned corresponding to each task regardless of the physical address and generated by the processor 300. The address a pointer or the like in the program stores is the virtual address.

The virtual address is translated into the physical address by an internal memory management function implemented by the kernel, and then mapped to the actual memory 200. To this end, a technique for translating the virtual address into the physical address is needed, and a paging technique may for example be used.

The processor 300 executes the program stored in the storage 100. The processor 300 is embodied by at least one universal processor that loads at least a part of the program from the storage 100, in which the program is stored, into the memory 200, and executes the loaded program. For example, the processor 300 may include at least one of a central processing unit (CPU), an application processor (AP), or a microprocessor.

When the processor 300 executes the program stored in the storage 100, data corresponding to each task of the process corresponding to the program is loaded into the memory 200, and thus the corresponding process occupies an area of the memory 200.

According to an embodiment, the operations of the processor 300 may be embodied by a computer program stored in a computer program product (not shown) provided separately from the electronic apparatus 1. In this case, the computer program product includes a memory in which an instruction corresponding to the computer program is stored, and a processor. Thus, the electronic apparatus 1 downloads and executes the computer program stored in the separate computer program product, and thus carries out the operations of the processor 300.

Further, according to an embodiment, the operations of the processor 300 may be carried out by a computer-readable program stored in the recording medium. The program, i.e., data stored in the recording medium may be directly accessed and executed by the processor 300, or downloaded and executed in the electronic apparatus 1 via a transmission medium embodied by a wired/wireless network, through which computer systems are connected to one another, thereby carrying out the operations.

According to an embodiment, the electronic apparatus 1 includes a display apparatus such as a television (TV) that processes a broadcast image based on at least one among a broadcast signal, broadcast information or broadcast data received from a transmitter of a broadcasting station.

According to another embodiment, the electronic apparatus 1 includes mobile apparatuses such as a mobile phone, a smartphone, a tablet computer or the like smart pad, a smart watch, and a head mountable display (HMD) or the like wearable device.

According to still another embodiment, the electronic apparatus 1 includes image sources such as a laptop computer, a desktop computer or the like personal computer (PC), a set-top box (STB), an optical disc player for a Blu-ray disc (BD), a digital versatile disc (DVD) or the like, etc.

In other words, the electronic apparatus 1 according to an embodiment of the disclosure may be embodied in various forms such as the TV, the mobile apparatus, etc., and therefore the elements included in the electronic apparatus 1 may exclude some element or additionally include other elements, for example, a display for displaying an image, a wired/wireless communication module for communication with an external apparatus (by Wi-Fi, Bluetooth, etc.) or the like electronic device without being limited to those of the foregoing embodiment.

The processor 300 supports two modes of a user mode and a kernel mode to prevent the application program from accessing, modifying and deleting data critical to the OS. The processor 300 allows the kernel mode to have higher authority than the user mode, and thus guarantees that the stability of the whole system is not damaged by an application program causing an error.

Figure 2:
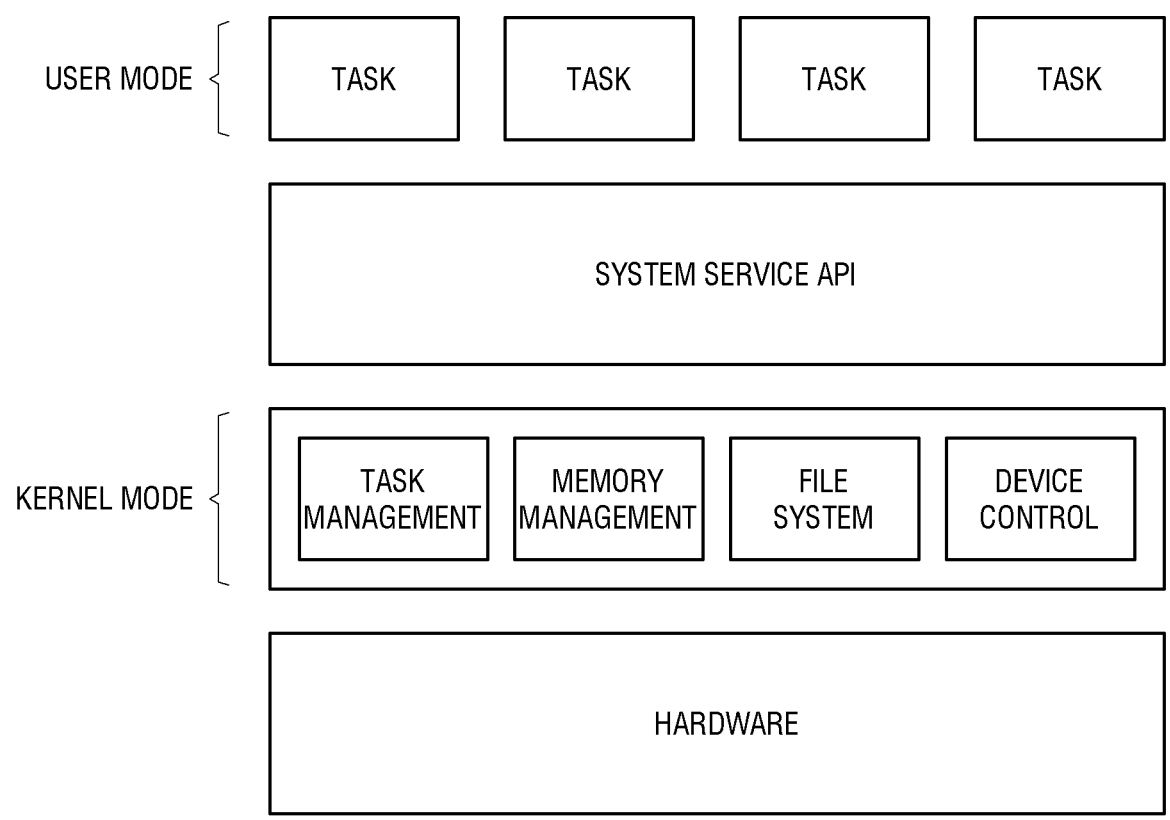
FIG. 2 illustrates a structure of an operating system (OS) in an electronic apparatus according to an embodiment of the disclosure.

FIG. 2 illustrates a structure of an OS in an electronic apparatus according to an embodiment of the disclosure. FIGS. 3 to 6 illustrate structures of a memory in an electronic apparatus according to an embodiment of the disclosure.

As shown in FIG. 2, an application program runs in the user mode.

The program running in the user mode, in other words, the process includes one or more tasks. Each task is assigned with its own user stack, and a program code is implemented using the corresponding stack. In the electronic apparatus 1 according to an embodiment of the disclosure, the task becomes a subject of using the memory 200.

Further, the process is executed in units of threads. In other words, the thread is a flow of the process execution. The process may include one or more threads, and the threads included in the process may be carried out in parallel. The thread has the same process identifier (PID) as the task by which the thread itself is generated has.

That is, in the following description, the task may be understood as the unit that owns resources and the thread may be understood as the unit of performance, but both the task and the thread may be interchangeable with each other while describing the operations based on the performance of the process.

In the kernel mode, task management, memory management, a file system, device control and the like sub systems operate. These are in charge of controlling hardware, and provide services needed in operating the application program. Functions available in the kernel mode are configured in the form of a system service application programming interface (API), so that the application program executed in the user mode can use the functions.

When the application program is executed by the processor 300 in the user mode, the user stacks are generated in units of the tasks with regard to the process of the application program, and a certain area of the memory 200 is assigned to the generated user stack. The data of the corresponding user stack can be recorded, i.e., stored in the assigned area of the memory 200.

As one process is assigned with one virtual memory 400, each process works in its own virtual space independently provided.

The virtual memory 400 has a structure that the kernel and the area for the application program are separated. According to an embodiment, the OS may be, as shown in FIG. 3, divided into a user area (also referred to as an application program area or an application area) 410 and a kernel area 420 with respect to a start point P1 of a dynamic memory area.

As described above, the OS uses two processor access modes of the kernel mode and the user mode. The kernel mode is accessible even to the data of the user area 410, but the user mode is not allowed to access the data of the kernel area 420.

Figure 3:
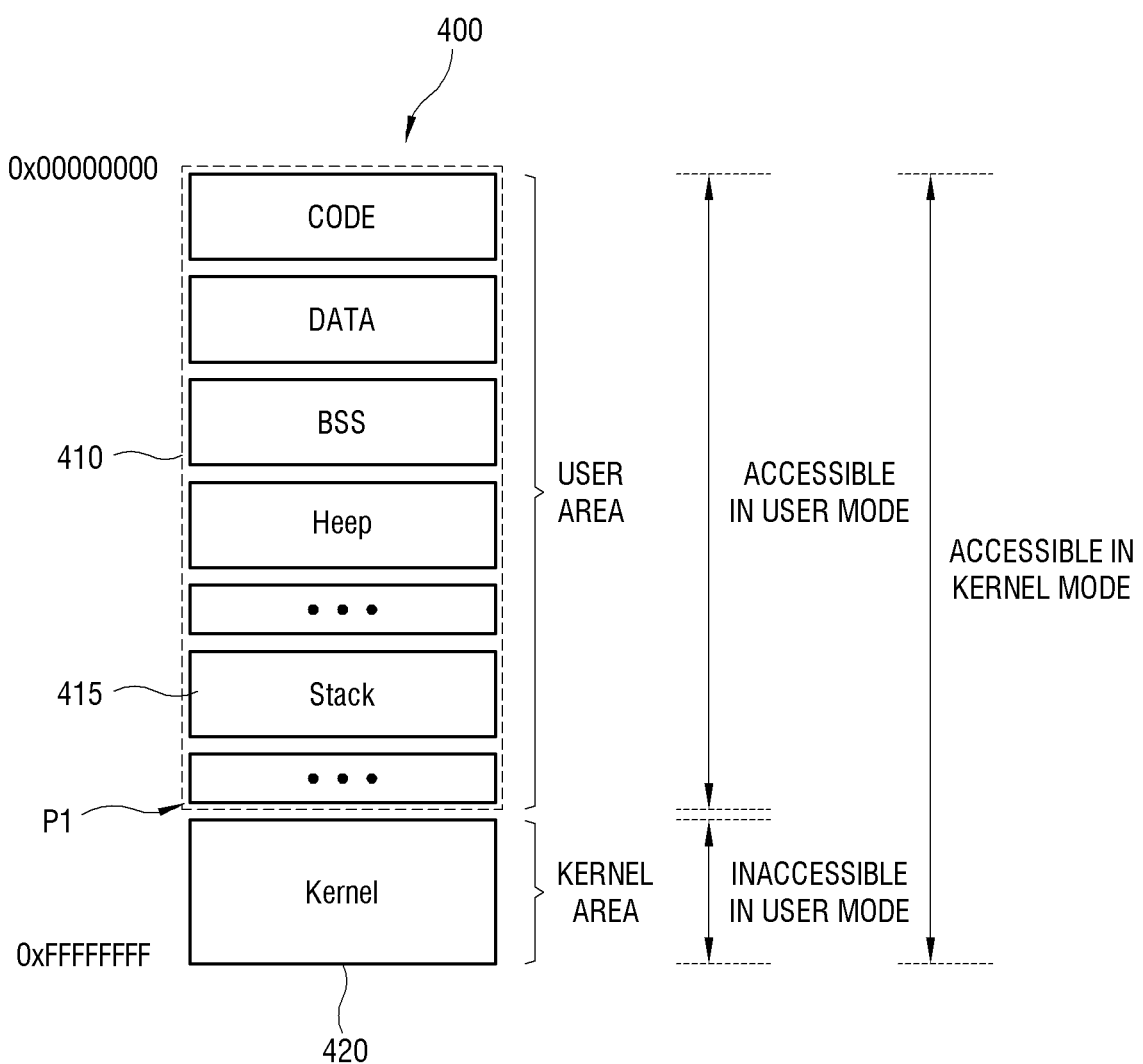
FIG. 3 illustrates structures of a memory in an electronic apparatus according to an embodiment of the disclosure.

The user area 410 is a memory space used for the operation of the program, and includes a code area, a data area, a block started by symbol (BSS) area, a heap area and a stack area as shown in FIG. 3. The user area 410 is a dynamic memory area, and allows the application program to be assigned with and use the area of the user area 410 in units of the tasks when the application program is executed.

The kernel area 420 is a memory space in which the OS is stored, and corresponds to all the memory space which is assigned to one process, except the user area 410. The kernel area 420 is a single area which is shared by all the processes using the kernel mode.

A stack area 415 of the user area 410 is an area in which a parameter and a local variable related to a call of a function are stored. The user stack is generated along with the call of the function according to the tasks and assigned to the stack area 415, and the stack is destroyed when the call of the function is completed. Such call information of the function stored in the stack area 415 is called a stack frame, and the stack frame is created when the function is called.

The tasks/threads that belong to one process share other user areas 410 except the stack area 415, in other words, the heap area, the data area, and the code area.

The stack area 415 is implemented in such a manner that data is stacked in a direction from a high address toward a low address of the virtual memory 400, i.e., in a direction from the bottom toward the top in FIG. 3, and operates conforming to last in, first out (LIFO).

Figure 4:
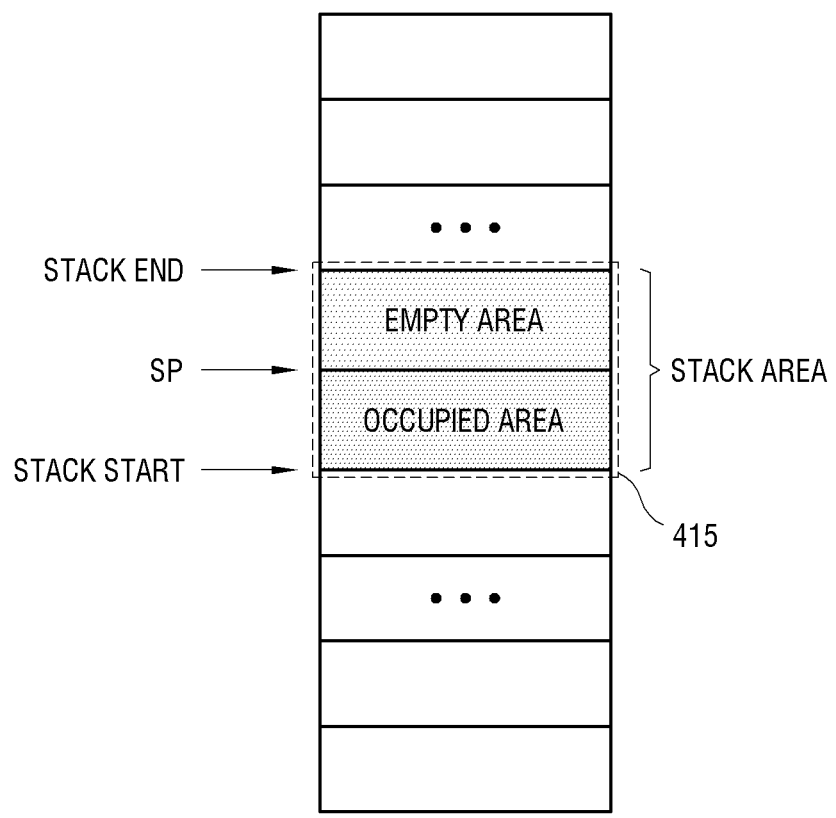
FIG. 4 illustrates a stack area of a memory in an electronic apparatus according to an embodiment of the disclosure.

The processor 300 has a stack pointer (SP), i.e., a register that points at a location assigned with data in the stack area 415. Referring to FIG. 4, in the stack area 415, an area from the stack start to a point at which the SP points (i.e., an occupied area) is assigned with meaningful data, but an area from the point to the stack end (i.e., an unused area) is empty. When a new item is added to the stack area 415 or data is removed from the stack area 415, the value of the stack pointer is increased or decreased.

The meaningful data refers to data being used by the process. The unused area may be assigned with meaningless data or data being not used by the process. In this regard, details will be described with reference to FIG. 6.

Figure 5:
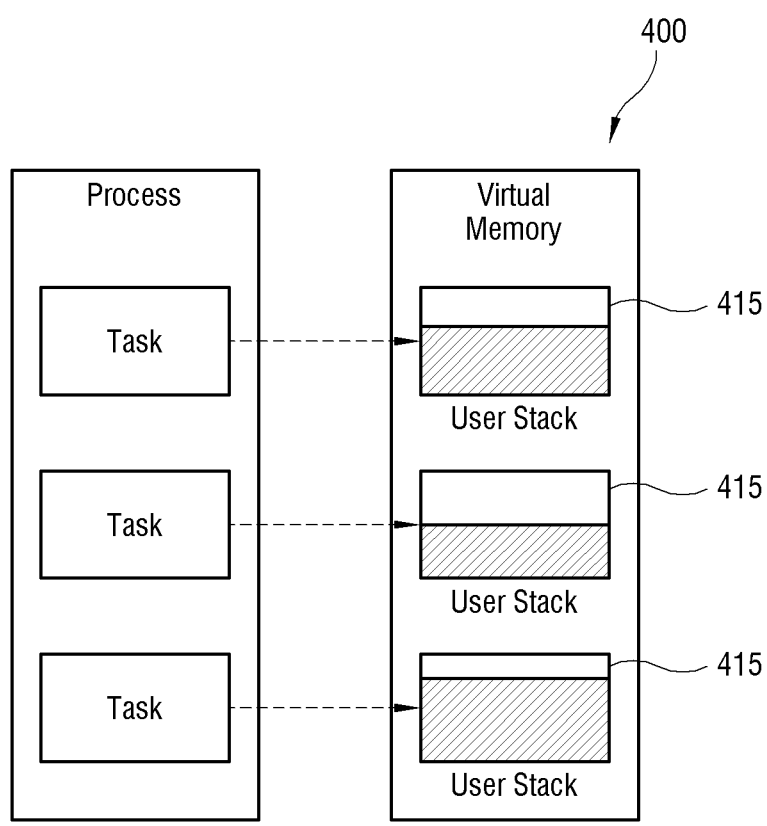
FIG. 5 illustrates operation of generating user stacks by tasks of a process of an application program and assigning the user stacks to stack areas in a memory of an electronic apparatus according to an embodiment of the disclosure.

When the application program is executed by the processor 300 in the user mode, the user stacks are generated according to the tasks of the process as shown in FIG. 5, and then assigned to the stack area 415 of the virtual memory 400.

The processor 300 is configured to process a piece, which is needed for the current performance, of data assigned to the virtual memory 400 according to the tasks to be recorded, i.e., stored in the actual memory 200. In this manner, many tasks are running at the same time without affecting each other, and share the limited area of the physical memory.

Figure 6:
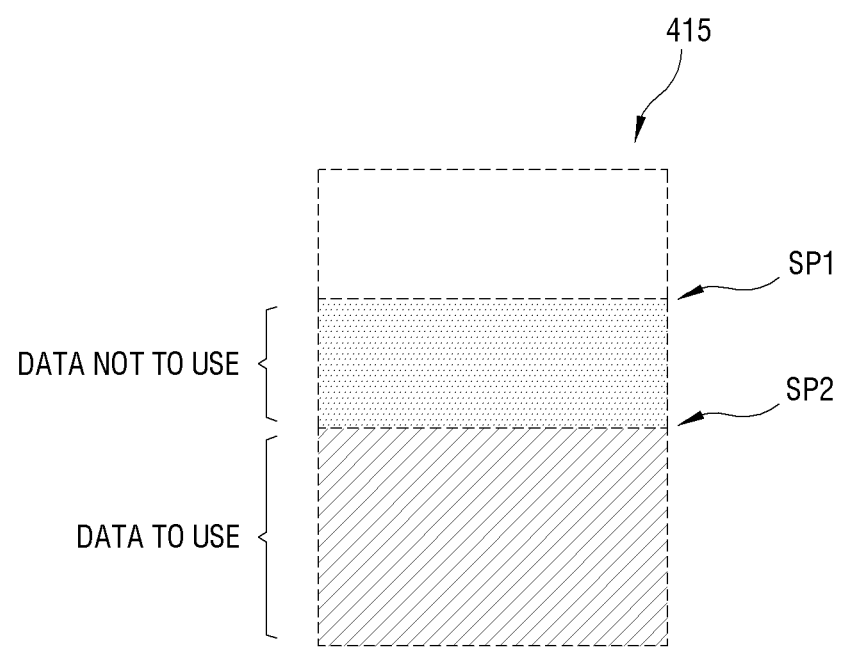
FIG. 6 illustrates data not to use stored in a stack area of a memory of an electronic apparatus according to an embodiment of the disclosure.

In general, the process calls a function based on an initialization procedure in an early stage of execution, and is thus increased in a range of assignment to the stack in the area 415. When the process is executed, the area of the memory 200 is assigned to the stack corresponding to the location of the stack pointer SP1 in an initialization section as shown in FIG. 6.

Then, when the function is returned, the stack is decreased in size. Thus, when the initialization is completed, the location at which the stack pointer SP2 points moves down as shown in FIG. 6. In other words, the location at which the stack pointer SP2 points is changed to have a relatively high address as compared with the stack pointer SP1 of the initialization section, Therefore, when the initialization of the process is completed, data between the stack pointers SP1 and SP2 as shown in FIG. 6 is data not to use, i.e., data not required to be stored.

Conventionally, the area of the memory 200 remains as assigned corresponding to the location of the stack pointer SP1 even after the initialization is completed, and therefore not only data to be in use but also data not to use occupy the area of the memory 200.

In the electronic apparatus 1 according to an embodiment of the disclosure, when the process is executed, the area of the memory 200 assigned to the data not to use is controlled to be discarded with respect to the location of the last stack pointer SP2, so that the discarded area can be used by another process. In other words, the area of the memory, to which the data not required to be stored among the data of the user stack is assigned, is discarded, thereby efficiently using the memory. Here, the last location of the stack pointer SP2 corresponds to a point in time when change in the data of the user stack is stopped.

Below, a method of managing the area of the memory 200 by the electronic apparatus 1 according to an embodiment of the disclosure will be described with reference to the accompanying drawings.

Figure 7:
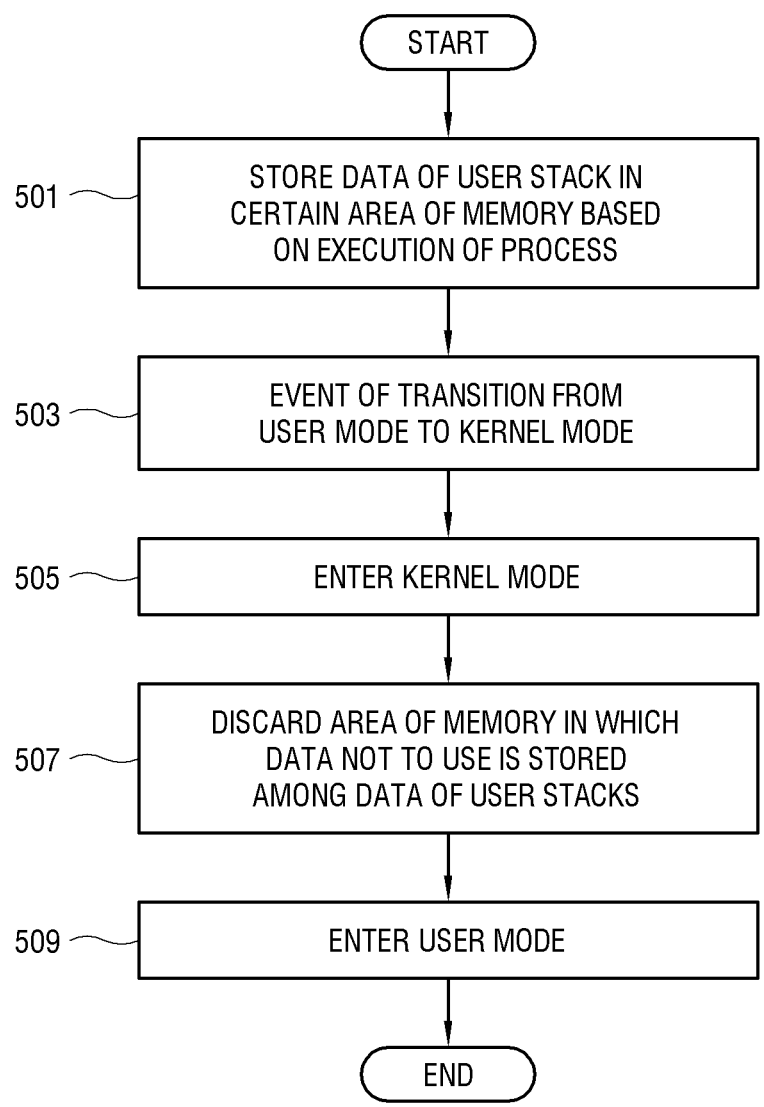
FIG. 7 is a flowchart showing a method of controlling an electronic apparatus according to an embodiment of the disclosure.
Figure 8:
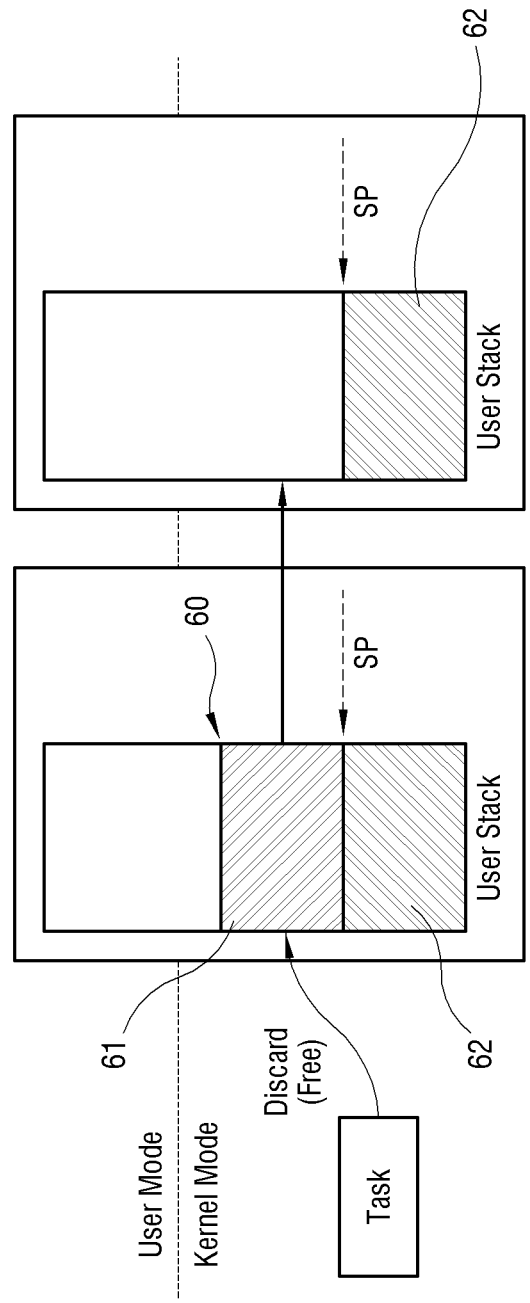
FIG. 8 is a views for describing specific an operations of discarding data of a user stack assigned to a section from a last stack point to a stack point of an initialization section in a method of controlling an electronic apparatus according to an embodiment of the disclosure.
Figure 9:
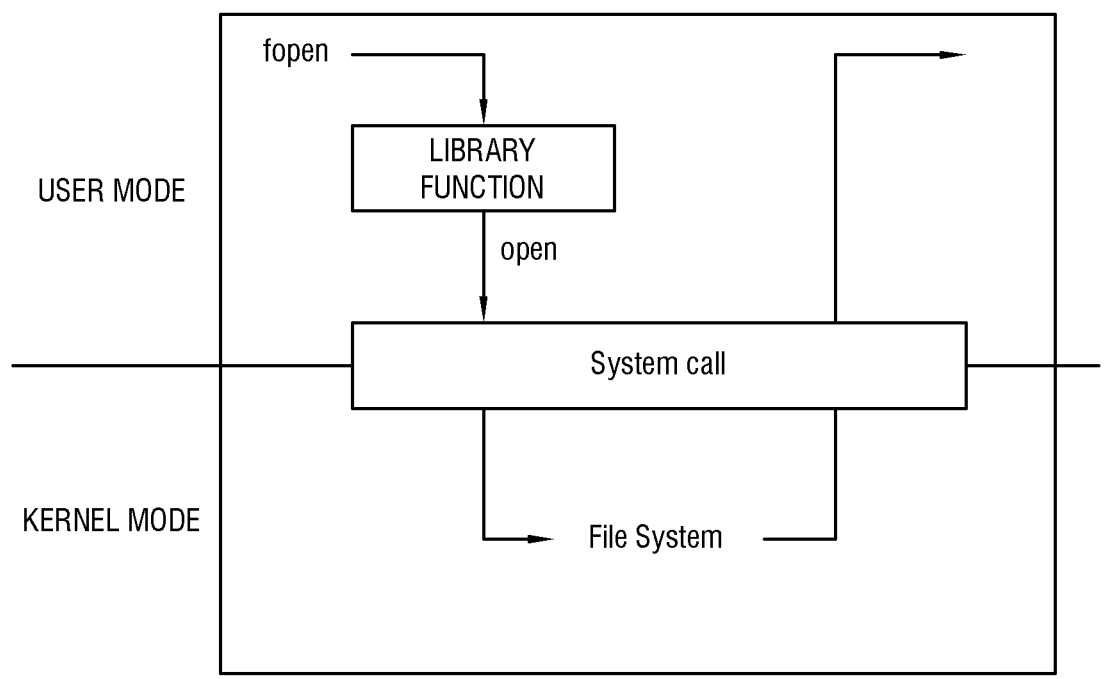
FIG. 9 is a view for describing an operation of switching over an operation system from a user mode to a kernel mode by calling a system call of 'open' in 'fopen' when a function of 'File Open' (fopen) of a library function is called as an example of the event in a method of controlling an electronic apparatus according to an embodiment of the disclosure."
Figure 10:
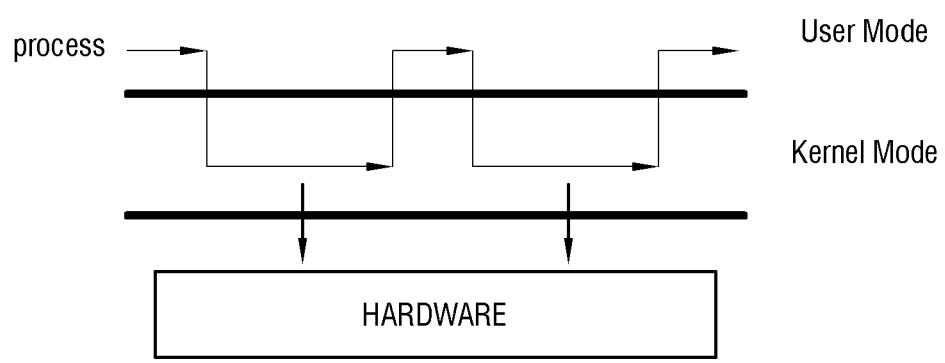
FIG. 10 is a view for describing an operation of switching over an operation system between a user mode and a kernel mode in a method of controlling an electronic apparatus according to an embodiment of the disclosure.
Figure 11:
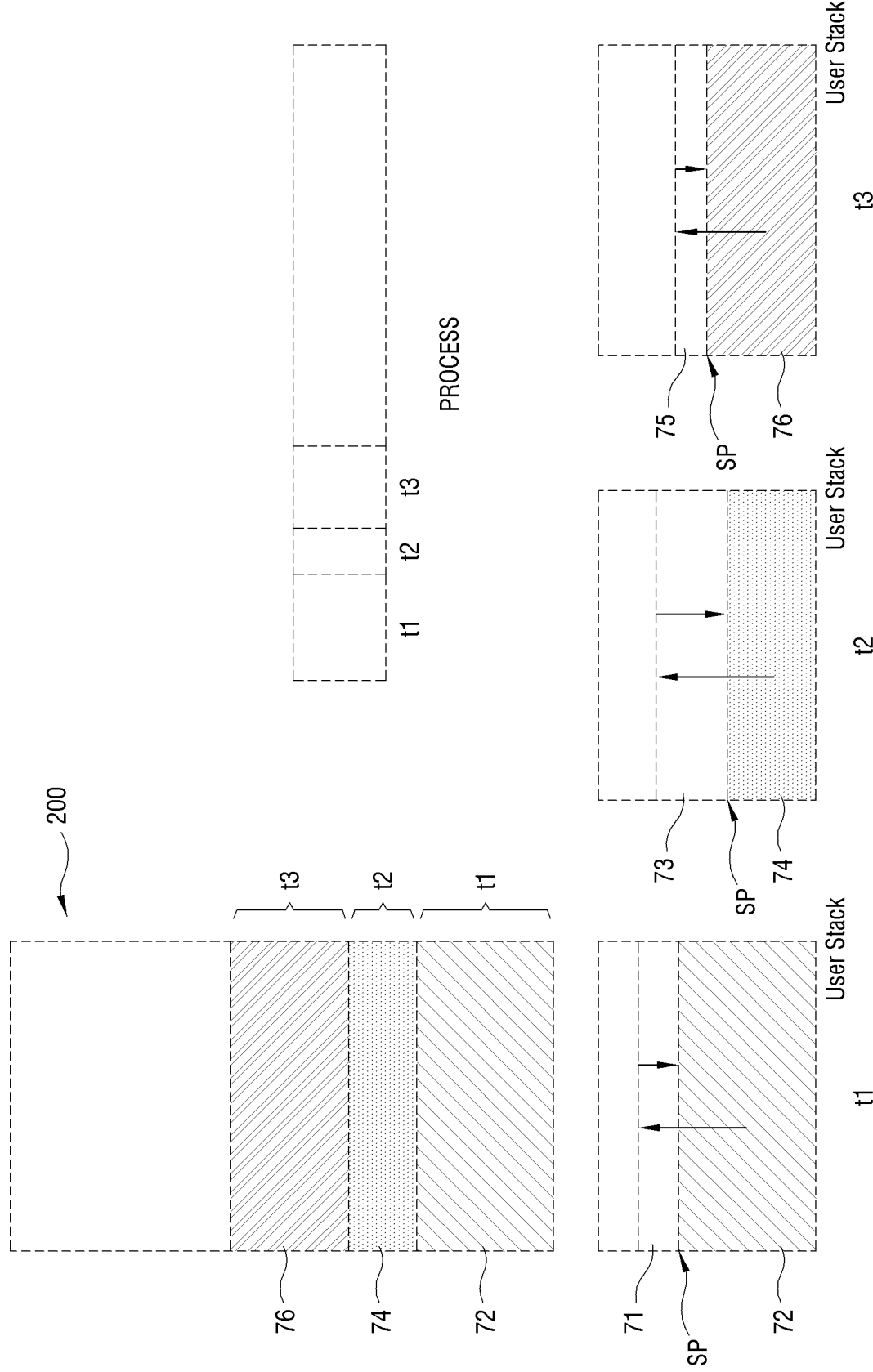
FIG. 11 conceptually illustrates assignment of a memory area according to an embodiment of the disclosure.

FIG. 7 is a flowchart showing a method of controlling an electronic apparatus according to an embodiment of the disclosure, FIGS. 8 to 10 are views for describing specific operations of a method of controlling an electronic apparatus according to an embodiment of the disclosure, and FIG. 11 conceptually illustrates assignment of a memory area according to an embodiment of the disclosure.

As shown in FIG. 7, the data of the user stack is stored in a certain area of the memory 200 as the process is executed in the user mode (501). Specifically, when the processor 300 executes the application program, the user stacks are generated corresponding to the tasks of the corresponding process as shown in FIG. 8. The generated user stack is assigned to the certain area of the memory 200, and the data of the corresponding user stack is recorded, i.e., stored in the area of the memory 200. Here, the area of the memory 200 is assigned corresponding to the location of the SP in the initialization section of the process.

While the process is performed like the operation 501, an event that the OS in the user mode enters the kernel mode may occur (503). Specifically, when the task makes a system call or an interrupt while the application program is running, the OS recognizes the system call or the interrupt as an event for switching over from the user mode to the kernel mode.

For example, the function of 'Read File' or 'File Open' needs a call of an internal routine that processes a function of reading data from an actual file. This routine should be executed in the kernel mode because it accesses a system data structure, and is therefore usable as a predetermined instruction for switching over from the user mode to the kernel mode. With this instruction, the OS can recognize that a system service is requested.

In FIG. 8, the SP points at the last location of the SP of when an event of entering the kernel mode occurs. Therefore, the data of the user stack assigned to a section 61 from the last SP to the SP 60 of the initialization section is the data not to use, i.e., the data not required to be stored.

In response to the event occurrence in the operation 503, the OS switches over from the user mode to the kernel mode (505). Specifically, as shown in FIG. 9, when the function of 'File Open' (fopen) of a library function is called as an example of the event in the operation 503 while the process is running, the OS switches over from the user mode to the kernel mode by calling the system call of 'open' in 'fopen'.

When the OS switches over to the kernel mode in the operation 505, the user stack is not generated any more with respect to the corresponding task, and therefore change in the data of the user stack in the user mode is stopped. Thus, the location of the stack pointer does not move any more.

The OS, i.e., the kernel discards the area of the memory 200 in which the data not to use among the data of the user stack of the corresponding task is stored (507). In other words, the time when the OS in the user mode enters the kernel mode in the operation 505 is time to discard a part (the area of the data not to use) of the area of the memory 200 assigned to the corresponding task. Accordingly, the area of the memory in which the data not to use while the process is running is properly discarded.

Specifically, the data of the user stack assigned to the section 61 from the last SP up to the SP 60 of the initialization section is the data not required to be stored, and thus, as shown in FIG. 8, the area of the memory 200 in which the corresponding data is stored. Then, only the data of the user stack assigned to a section 62 from the stack start up to the last SP occupies the memory 200.

Further, the OS is switched over to the user mode again, as shown in FIG. 9, while discarding a response to the application program after carrying out the work using the system resources in the kernel mode (509). In this manner, the processor 300 can, as shown in FIG. 10, control the OS to switch over between the user mode and the kernel mode, thereby maintaining the stability of the whole system.

When the OS is switched over to the user mode in the operation 505, the user stacks are generated according to the tasks of the process as described in the operation 501, and the operation that the data of the generated user stack is assigned to and stored in the certain area of the memory 200 is continuously performed.

The process is configured with a set of one or more tasks. According to the foregoing embodiment, as shown in FIG. 11, user stacks are generated in sequence corresponding to a plurality of tasks t1, t2 and t3 as the process is executed.

Specifically, the area of the memory 200 is assigned to the user stack generated with regard to the task 1 t1, and the data of each user stack is recorded in the corresponding area. In other words, the area of the memory 200 is assigned corresponding to areas 71 and 72 with regard to the task 1 t1. Further, when the task 1 enters the kernel mode by the system call or the interrupt, the area 71 in which the data not to use is recorded is discarded based on the location of the SP. As the work using the system resources is carried out in the kernel mode, and a response is discarded to the application program, the task 1 is switched over again to the user mode.

Next, the area of the memory 200 is assigned to the user stack generated with regard to the task 2 t2, and the data of each user stack is recorded in the corresponding area. In other words, the area of the memory 200 is assigned corresponding to areas 73 and 74 with regard to the task 2 t2. Further, when the task 2 enters the kernel mode by the system call or the interrupt, the area 73 in which the data not to use is recorded is discarded based on the location of the SP. As the work using the system resources is carried out in the kernel mode, and a response is discarded to the application program, the task 2 is switched over again to the user mode.

Then, the area of the memory 200 is assigned to the user stack generated with regard to the task 3 t3, and the data of each user stack is recorded in the corresponding area. In other words, the area of the memory 200 is assigned corresponding to areas 75 and 76 with regard to the task 3 t3. Further, when the task 3 enters the kernel mode by the system call or the interrupt, the area 75 in which the data not to use is recorded is discarded based on the location of the SP. As the work using the system resources is carried out in the kernel mode, and a response is discarded to the application program, the task 3 is switched over again to the user mode.

Accordingly, the memory 200 is occupied up to the areas 72, 74 and 76 at which the stack pointers (SP) point with regard to the tasks 1, 2 and 3 t1, t2 and t3, and the area of the memory 200 corresponding to the discarded areas 71, 73 and 75 are freely usable by other processes. Therefore, the memory is effectively saved as much as the substantially discarded areas 71, 73 and 75.

Figure 12:
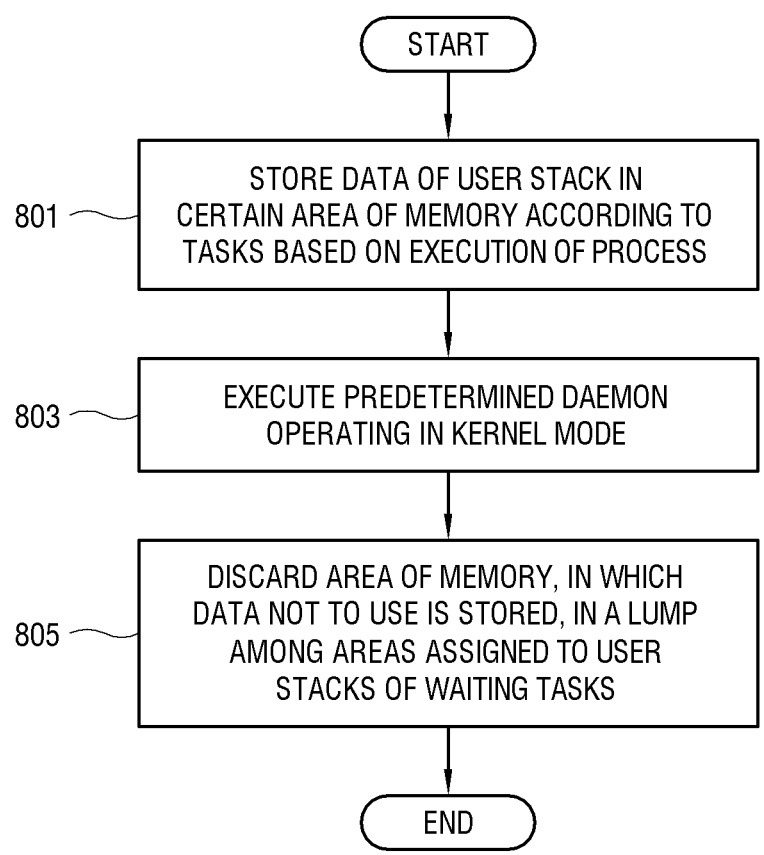
FIG. 12 is a flowchart showing a method of controlling an electronic apparatus according to another embodiment of the disclosure.
Figure 13:
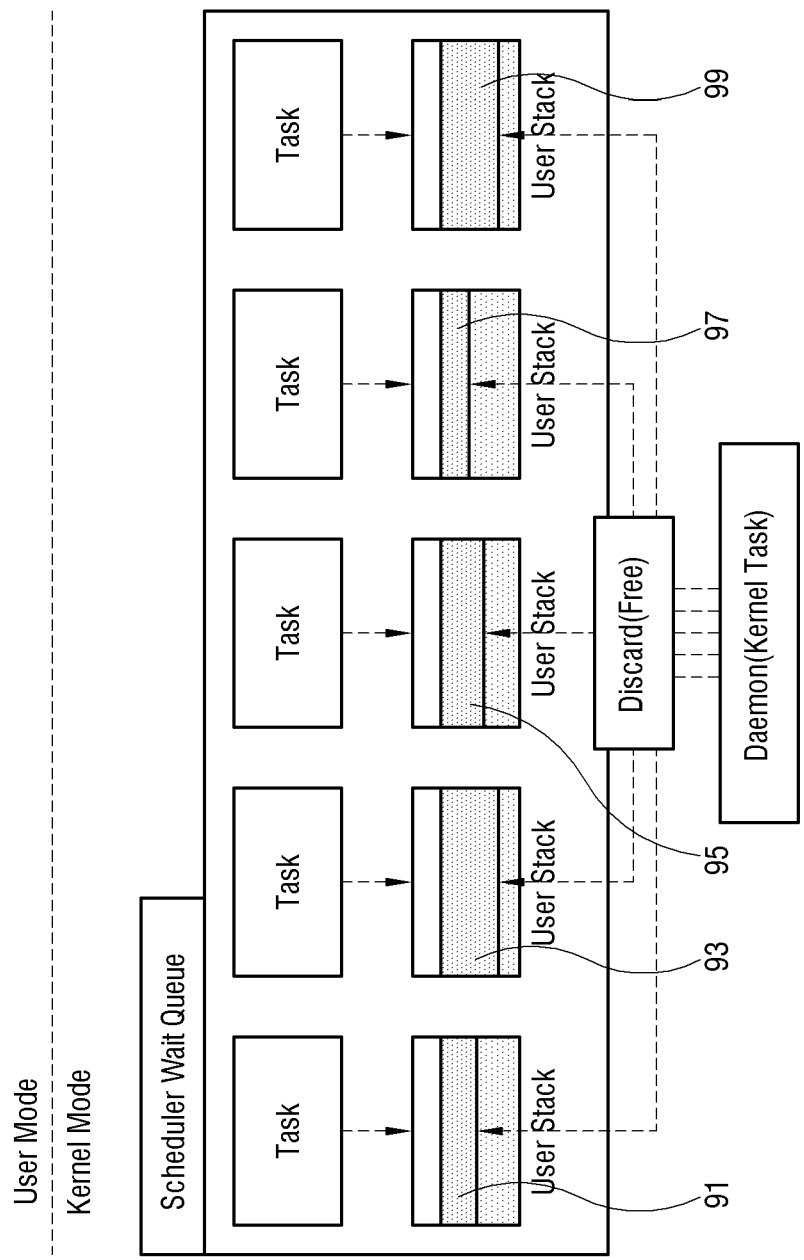
FIG. 13 is a view for describing specific operations of a method of controlling an electronic apparatus according to an embodiment of the disclosure.

FIG. 12 is a flowchart showing a method of controlling an electronic apparatus according to another embodiment of the disclosure, and FIG. 13 is a view for describing specific operations of a method of controlling an electronic apparatus according to an embodiment of the disclosure.

As shown in FIG. 12, the data of the user stack is stored in a certain area of the memory 200 as the process is executed in the user mode (801). Specifically, as described in the operation 501 according to an embodiment, the user stacks are generated corresponding to the tasks, and the generated user stack is assigned to the certain area of the memory 200, thereby recording, i.e., storing the data of the corresponding user stack in the area of the memory 200.

Here, the state of the process is changed in order of ready, running and waiting (blocked) and repeats the running process until the process is terminated and exits from the system. The OS uses a processor scheduler to manage a state change of the process.

The process includes one or more tasks/threads, and each of the tasks/threads is divided into ready, running, waiting (blocked) and terminated states. From a process running point of view, one process is divided into a plurality of running units, i.e., threads, and activated to make the thread of the running state occupy the processor 300. The threads that belong to one process include program counters and stacks for their own information. Although one or more threads are in waiting state, other threads are executable.

The threads/tasks of such waiting state are switched over to the kernel mode, and are on standby in a wait queue of the scheduler as shown in FIG. 13.

In the state that the process including the plurality of tasks/threads as shown in the operation 801 is performed, a predetermined daemon that operates in the kernel mode may be executed (803). The daemon refers to a process (e.g., a kernel task) that provides a specific service while operating in the background of the OS, and may be called in response to occurrence of a preset specific event. Here, there are no limits to the kinds of events, and for example, the event may be previously set to execute the corresponding daemon in a predetermined cycle, or may be configured to execute the corresponding daemon when a preset user input occurs.

The daemon executed in the operation 803, as shown in FIG. 13, discards areas 91, 93, 95, 97 and 99 of the memory, in which data not to use based on the location of the stack pointer is stored, in a lump among the areas assigned to the user stacks of the waiting tasks (or the blocked tasks) (805). In other words, the areas of the memory assigned to the plurality of waiting tasks are efficiently discarded.

The areas of the memory 200 corresponding to the discarded areas 91, 93, 95, 97 and 99 are usable by other processes, thereby having an effect on saving the memory as much as the substantially discarded areas.

Meanwhile, the electronic apparatus 1 according to an embodiment of the disclosure may perform swapping to store data of a specific process in the storage 100 based on a predetermined reference, among blocks loaded to the memory 200, independently of the operations 501 to 509 and the operations 801 to 803.

Specifically, when the processor 300 reads a process to be executed next from the storage 100 and loads the process into the memory 200, the memory 200 may have a space insufficient for this process. In this case, a swap daemon (kswapd), which operates in the kernel mode, performs the swapping to swap out the data of the process being currently loaded to the memory 200, and to swap in data of a desired process. The swap daemon (kswapd) is different from the daemon executed in the operation 803 of the embodiment shown in FIG. 12.

When the space of the memory 200 assigned to the data swapped out by the swapping becomes empty, the swapped-in data is assigned to the empty space. The swapped-out data is reclaimed as it is stored in a swap area or swap device of the storage 100.

In the foregoing swapping, all the memory areas, to which the stacks of the corresponding process are assigned, are reclaimed regardless of the stack pointer. Therefore, the reclaiming of the memory area based on the swapping is different from the discarding of the memory area based on the stack pointer according to embodiments of the disclosure.

Although a few exemplary embodiments of the disclosure have been described in detail, various changes may be made in these exemplary embodiments without departing from the scope defined in the appended claims.

The invention claimed is:

1. An electronic apparatus comprising:
a storage;
a processor configured to execute a program including an operating system (OS) and an application program stored in the storage; and
a memory configured to load and store the program based on execution of the program,
wherein the processor is configured to control the OS to:
based on a user input, execute a process of the application program;
based on the execution of the process, perform an operation of creating a user stack corresponding to at least one task of the process and storing data of the created user stack in a predetermined area of the memory;
based on an event corresponding to the user input related to the process or a predetermined event related to the process being generated when the process is executed, stop change in the data of the user stack of the predetermined area;
discard an area in which data used in a procedure of initiating the process among the stored data of the user stack is stored, in the predetermined area, so that at least one of another process included in the application program or another application program uses the discarded area; and
based on a work corresponding to the event corresponding to the user input or the predetermined event being completed, continuously perform the operations,
wherein the user stack is created in units of tasks of the process based on the execution of the process, and the predetermined area of the memory is assigned to the created user stack, and
wherein the processor is further configured to control the OS to discard the area of the predetermined area of the memory among areas of the memory, to which the user stacks created corresponding to running tasks are assigned, based on transition of the running tasks from a user mode to a kernel mode.

2. The electronic apparatus according to claim 1, wherein the discarded area of the memory is identified based on a stack pointer that points at a location of data assigned to the user stack.

3. The electronic apparatus according to claim 1, wherein the processor is configured to control the OS in the user mode to enter the kernel mode, based on occurrence of a system call or an interrupt from the running task.

4. The electronic apparatus according to claim 1, wherein the discarded area of the memory is identified based on the stack pointer that points at the location of data assigned to the user stack, based on the running task in the user mode enters the kernel mode.

5. An electronic apparatus comprising:
   a storage;
   a processor configured to execute a program including an operating system (OS) and an application program stored in the storage; and
   a memory configured to load and store the program based on execution of the program,
   wherein the processor is configured to control the OS to:
   based on a user input, execute a process of the application program;
   based on the execution of the process, perform an operation of creating a user stack corresponding to at least one task of the process and storing data of the created user stack in a predetermined area of the memory;
   based on an event corresponding to the user input related to the process or a predetermined event related to the process being generated when the process is executed, stop change in the data of the user stack of the predetermined area;
   discard an area in which data used in a procedure of initiating the process among the stored data of the user stack is stored, in the predetermined area, so that at least one of another process included in the application program or another application program uses the discarded area; and
   based on a work corresponding to the event corresponding to the user input or the predetermined event being completed, continuously perform the operation,
   wherein the user stack is created in units of tasks of the process based on the execution of the process, and the predetermined area of the memory is assigned to the created user stack, and
   wherein the processor is further configured to control the OS to discard the area of the predetermined area of the memory, among areas of the memory assigned to user stacks corresponding to tasks of the process, during operation of the processor in a kernel mode.

6. The electronic apparatus according to claim 5, wherein the processor is configured to control the OS to execute a predetermined daemon to discard the area of the predetermined area of the memory corresponding to the tasks of the process, during operation of the processor in the kernel mode.

7. The electronic apparatus according to claim 5, wherein the discarded area of the memory is identified based on the stack pointer that points at a location of data assigned to the user stacks of the tasks of the process.

8. A method of controlling an electronic apparatus comprising a storage, a processor configured to execute a program including an operating system (OS) and an application program stored in the storage, and a memory configured to load and store the program based on execution of the program, the method controlling the OS, the method comprising:
   based on a user input, executing a process of the application program;
   based on the execution of the process, performing an operation of creating a user stack corresponding to at least one task of the process and storing data of the created user stack in a predetermined area of the memory;
   based on an event corresponding to the user input related to the process or a predetermined event related to the process being generated when the process is executed, stopping change in the data of the user stack of the predetermined area;
   discarding an area in which data used in a procedure of initiating the process among the stored data of the user stack is stored, in the predetermined area, so that at least one of another process included in the application program or another application program uses the discarded area; and
   based on a work corresponding to the event corresponding to the user input or the predetermined event being completed, continuously performing the operation,
   wherein the user stack is created in units of tasks of the process based on the execution of the process, and the predetermined area of the memory is assigned to the created user stack, and
   wherein the method further comprises discarding the area of the predetermined area of the memory among areas of the memory, to which the user stacks created corresponding to running tasks are assigned, based on transition of the running tasks from a user mode to a kernel mode.

9. The method according to claim 8, wherein the discarding the area of the predetermined area of the memory comprises identifying the discarded area of the memory based on a stack pointer that points at a location of data assigned to the user stack.

* * * * *